US012615135B2

(12) United States Patent
Grinberg

(10) Patent No.: US 12,615,135 B2
(45) Date of Patent: Apr. 28, 2026

(54) SECURING SENSITIVE DATA STORED IN AN OBJECT OF A DISTRIBUTED COMPUTING ENVIRONMENT

(71) Applicant: Red Hat, Inc., Raleigh, NC (US)

(72) Inventor: Zvi Yehuda Hirsh Grinberg, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 211 days.

(21) Appl. No.: 18/596,080

(22) Filed: Mar. 5, 2024

(65) Prior Publication Data

US 2025/0286703 A1      Sep. 11, 2025

(51) Int. Cl.
*H04L 9/08*      (2006.01)

(52) U.S. Cl.
CPC ............ H04L 9/0825 (2013.01); H04L 9/088 (2013.01)

(58) Field of Classification Search
None
See application file for complete search history.

(56) References Cited

U.S. PATENT DOCUMENTS

| | | | | |
|---|---|---|---|---|
| 12,061,804 B2 * | 8/2024 | Shimotaya | ............ | G06F 3/0623 |
| 2016/0142387 A1 * | 5/2016 | Lockhart | ............... | H04L 63/061 |
| | | | | 713/171 |

| | | | | |
|---|---|---|---|---|
| 2016/0292431 A1 * | 10/2016 | Sreekanti | .............. | G06F 21/602 |
| 2018/0176193 A1 * | 6/2018 | Davis | ..................... | H04L 9/3247 |
| 2022/0174067 A1 * | 6/2022 | Hawkinson | ........... | H04L 63/101 |
| 2022/0180000 A1 * | 6/2022 | Sofia | ........................ | G06F 21/53 |
| 2022/0283794 A1 * | 9/2022 | Wolfson | ................ | H04L 9/0822 |
| 2023/0037986 A1 * | 2/2023 | Li | ........................... | G06F 21/78 |
| 2024/0411909 A1 * | 12/2024 | Yuan | ..................... | G06F 21/606 |

* cited by examiner

*Primary Examiner* — Bassam A Noaman

(74) *Attorney, Agent, or Firm* — Kilpatrick Townsend & Stockton LLP

(57)      ABSTRACT

Sensitive data stored in an object of a distributed computing environment can be secured. For example, a pod can be deployed in a distributed computing environment. The pod can include an initialization container. The initialization container can retrieve encrypted data from an object in the distributed computing environment and a decryption key from a key source, where both object and the key source are separate from the pod. The initialization container can decrypt the encrypted data using the decryption key to produce decrypted data. The initialization container can then overwrite the encrypted data stored in the object with the decrypted data. After deploying the initialization container, an application container can be deployed in the pod, where the application container can retrieve the decrypted data from the object and initialize one or more environment variables of the application using the decrypted data.

19 Claims, 5 Drawing Sheets

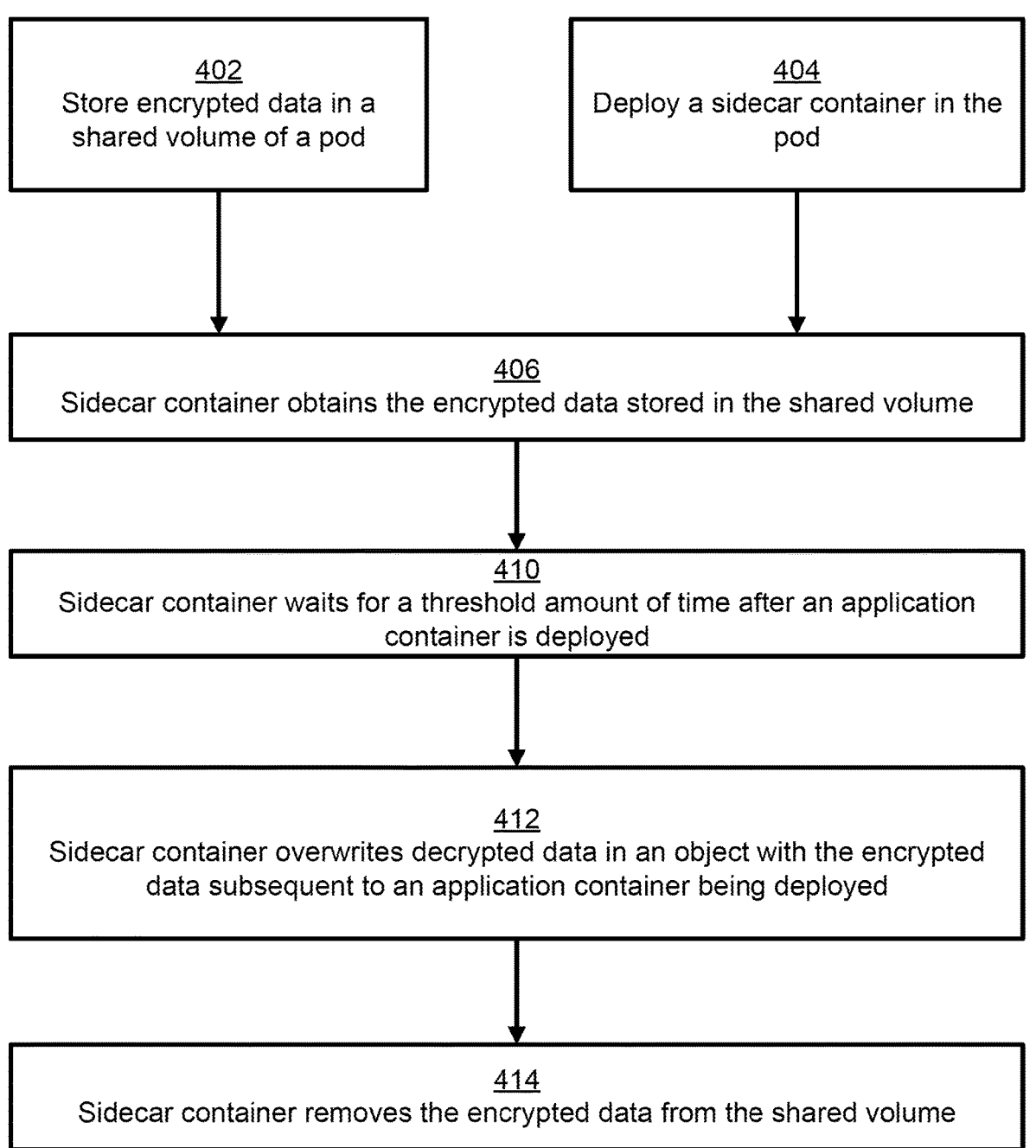

402
Store encrypted data in a shared volume of a pod

404
Deploy a sidecar container in the pod

406
Sidecar container obtains the encrypted data stored in the shared volume

410
Sidecar container waits for a threshold amount of time after an application container is deployed

412
Sidecar container overwrites decrypted data in an object with the encrypted data subsequent to an application container being deployed

414
Sidecar container removes the encrypted data from the shared volume

FIG. 4

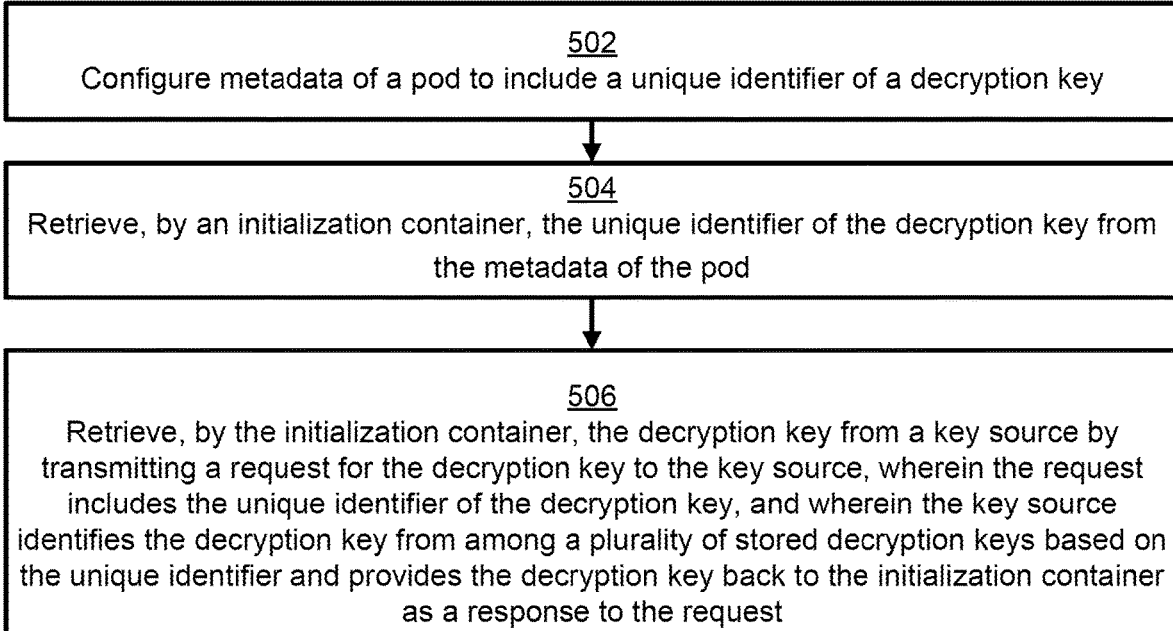

502
Configure metadata of a pod to include a unique identifier of a decryption key

504
Retrieve, by an initialization container, the unique identifier of the decryption key from the metadata of the pod

506
Retrieve, by the initialization container, the decryption key from a key source by transmitting a request for the decryption key to the key source, wherein the request includes the unique identifier of the decryption key, and wherein the key source identifies the decryption key from among a plurality of stored decryption keys based on the unique identifier and provides the decryption key back to the initialization container as a response to the request

FIG. 5

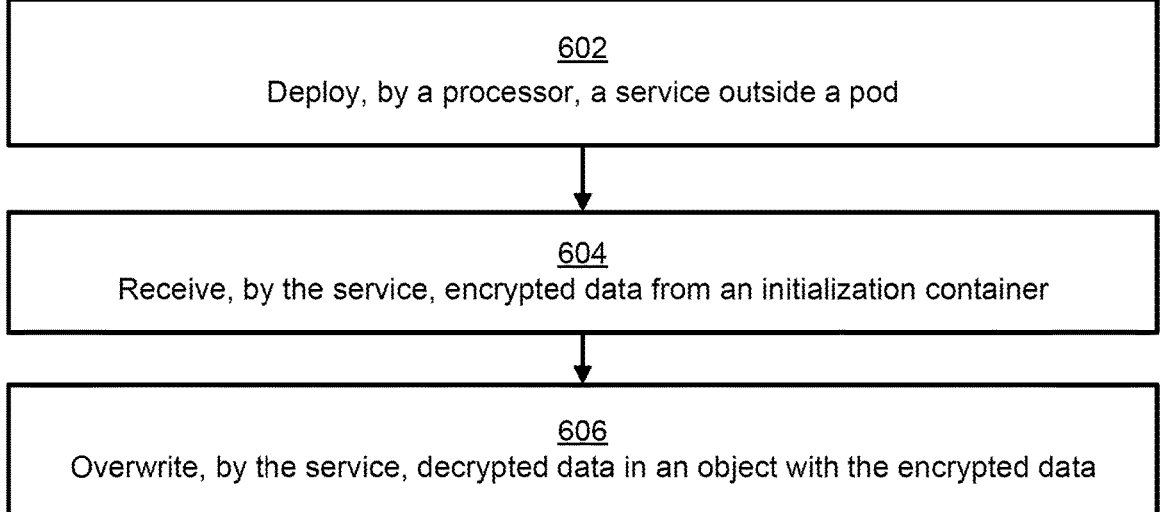

602
Deploy, by a processor, a service outside a pod

604
Receive, by the service, encrypted data from an initialization container

606
Overwrite, by the service, decrypted data in an object with the encrypted data

FIG. 6

SECURING SENSITIVE DATA STORED IN AN OBJECT OF A DISTRIBUTED COMPUTING ENVIRONMENT

TECHNICAL FIELD

The present disclosure relates generally to encryption and decryption of digital information in distributed computing environments. More specifically, but not by way of limitation, this disclosure relates to securing sensitive data stored in an object of a distributed computing environment.

BACKGROUND

Cloud computing environments and other types of distributed computing environments are an increasingly popular way to store, transmit, and use data without direct active management by a user. In distributed computing environments, computing services can be virtualized and separated from the underlying physical hardware. The virtualized computing services may then be distributed or deployed across multiple physical computing systems.

One way to "virtualize" computing services is using containers (e.g., relatively isolated virtual environments), which are different from conventional virtual machines. Containers can be deployed from image files by a container engine, such as Docker. Many containers can be deployed on a single physical host. Compared to more traditional virtual machines, containers are more lightweight. As a result, containers have become favored over conventional virtual machines in the industry.

To help manage the large number of containers that can be deployed in a distributed computing environment, container orchestration platforms have been developed. One example of a container orchestration platform is Kubernetes. In Kubernetes, multiple containers can be encompassed within a pod, which is the smallest deployable unit in Kubernetes. Containers within a pod can share storage and network resources of the underlying physical host.

There can be many different kinds of containers, such as application containers, sidecar containers, and initialization containers. Application containers can refer to the primary containers within a pod that run applications. Sidecar containers, also sometimes referred to as proxy containers, can be secondary containers that run alongside the main application container within the same pod. They typically perform additional services to assist the application container without directly altering the primary application code. Initialization containers, also sometimes referred to as "init" containers, typically run at the beginning of a pod startup and facilitate the startup and initialization of the application container.

BRIEF DESCRIPTION OF THE DRAWINGS

FIG. 4 shows a flowchart of an example of a process for overwriting decrypted data with encrypted data in an object according to some aspects of the present disclosure.

FIG. 5 shows a flowchart of an example of a process for retrieving a decryption key from a key source using a unique identifier according to some aspects of the present disclosure.

FIG. 6 shows a flowchart of an example of a process for overwriting decrypted data with encrypted data according to some aspects of the present disclosure.

DETAILED DESCRIPTION

Figure 1:
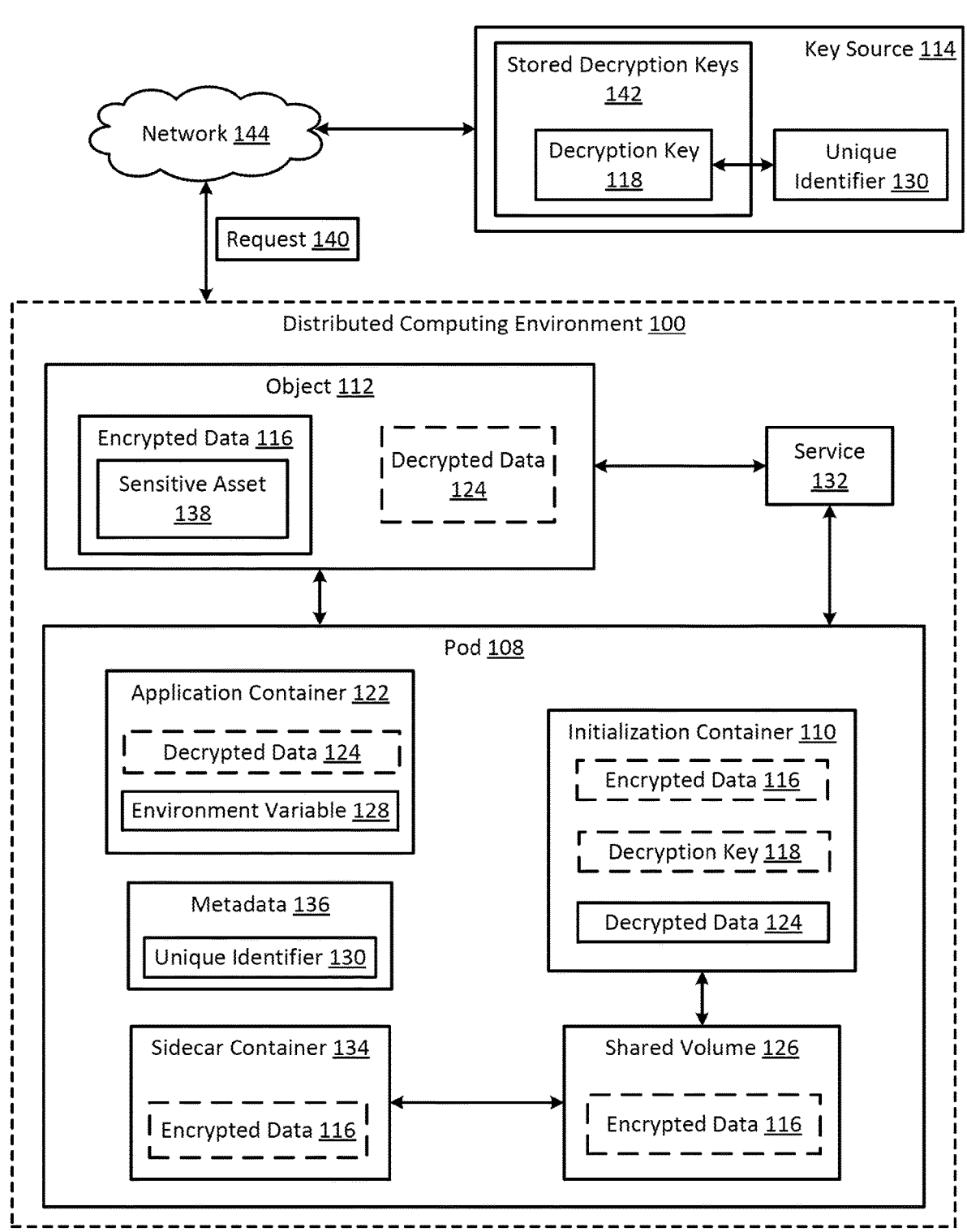
FIG. 1 shows a block diagram of an example of a system for securing sensitive data stored in an object of a distributed computing environment according to some aspects of the present disclosure.

Distributed computing environments, such as those containing container orchestration platforms like Kubernetes, are vulnerable to security threats due to the storage and transmission of unencrypted data in objects. As an example, a Kubernetes environment may store unencrypted data in an object, so that an application container can retrieve the unencrypted data from the object to perform various functions. Objects can be persistent entities within the distributed computing environment. In Kubernetes, objects can be deployed from definition files having configuration data that specify their characteristics. One example of such an object can be a secret object. A secret object can be a data object that is stored in a database internal to Kubernetes and represents sensitive data such as passwords, tokens, or keys. Objects can also represent running processes in Kubernetes. For example, a Pod object can be a data object that is stored in a database internal to Kubernetes and represents a running pod in the Kubernetes environment. Objects can be interacted with by providing commands to an API (e.g., the Kubernetes API) of the distributed computing environment.

Storing unencrypted data in an object renders the data vulnerable to compromise, which can be problematic because there are many instances where the data includes sensitive assets, such as secrets, certificates, personally identifiable information, passwords, pin codes, secrets, etc. To help reduce this vulnerability, the data may be encrypted in the object. When the data is encrypted in the object, individuals that are authorized to access the object, using role based access control for instance, will only see the data in its encrypted form. However, this encryption is typically weak. For instance, base64 encryption is commonly used, which is easy to crack. Stronger encryption techniques may be used, but then an application container may need a decryption key to retrieve the encrypted data and decrypt it. Since applications containers are among the most vulnerable types of containers because they normally have endpoints exposed to users, which may try to maliciously manipulate the application containers, providing the decryption key to the application container may jeopardize the security of the decryption key (and the data). It may therefore be desirable to provide improved security measures to protect sensitive assets stored in an object in a distributed computing environment.

Some examples of the present disclosure can overcome one or more of the abovementioned problems by using a combination of different types of containers in a pod to encrypt and decrypt data stored in an object, thereby improving the protection of the data and the key. As an example, distributed computing environment can deploy a pod that will be used to host an application, which may require data from an object to perform some or all of its functionality. The data may be stored in an encrypted format in the object to protect the data. Before deploying the application container in the pod, the distributed computing environment can deploy an initialization container within the pod. The initialization container can retrieve the encrypted data from the object and an encryption key from a key source. The key source may or may not be stored within the distributed computing environment. The initialization container then can decrypt the encrypted data using the key to generate decrypted data. Because the initialization container does not run applications that are exposed to users outside of the pod, it may be challenging for any malicious actors to access the key or exploit the initialization container. Next, the initialization container can overwrite the encrypted data in the object with the decrypted data. An application container may then be deployed within the pod, where the application container is separate from the initialization container. The application container can retrieve the decrypted data from the object and use it as needed (e.g., to initialize one or more environment variables within the application container). Using this approach, the data stored in the object remains protected behind encryption until the initialization container is called. Additionally, the decryption key is better protected because of the separation between the application container and the initialization container.

At this stage, the data has been decrypted and stored in the object, which may also present security concerns. To help resolve these additional security concerns, additional functions can be performed. For example, the initialization container can store the encrypted data that it previously retrieved from the object (prior to decrypting) in a shared volume of the pod. The distributed computing environment can deploy a sidecar container within the pod. The sidecar container can obtain encrypted data from the shared volume of the pod. The sidecar container can wait until the application has finished setting its environment variables and then overwrite the decrypted data in the object with the encrypted data, so the data is once again encrypted inside the object. The sidecar container can then remove the encrypted data from the shared volume. In other examples, the initialization container (or a separate service that exists outside the pod) may perform these additional functions of the sidecar container. Either way, through this process, the data may only be decrypted for a very short amount of time while the application container sets its environment variables or performs any other required functions involving the decrypted data, so that its potential exposure is minimized. And the decryption key is only exposed to the initialization container and not the other two containers, helping to reduce the likelihood of the key becoming compromised.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system for securing sensitive data stored in objects of distributed computing environments according to some aspects of the present disclosure. The system includes a distributed computing environment 100 with a pod 108 (also referred to herein as a "pod" for simplicity), an object 112, and a service 132. Examples of the object 112 can include a Kubernetes object, a database, a file, or a buffer.

The pod 108 can be deployed in the distributed computing environment 100. Inside the pod 108, storage and network resources may be shared among containers within the pod 108. Among the containers in the pod 108 is an initialization container 110 which may be configured to operate with other components stored and deployed within the pod 108. For instance, the initialization container 110 may be configured to retrieve encrypted data 116 from the object 112. The retrieved encrypted data 116 may include secrets, such as a sensitive asset 138. The sensitive asset could be a certificate, personally identifiable information, passwords, PIN codes, or other secret information not meant to be shared.

The initialization container 110 can also retrieve a decryption key 118 from a key source 114. The key source 114 may be located within the distributed computing environment 100 or it can be separate from the distributed computing environment 100. When the key source 114 is separate from the distributed computing environment 100, the key source 114 may communicate with the distributed computing environment 100 by way of a network 144, such as the Internet. The key source 114 includes one or more stored decryption keys 142. The one or more stored decryption keys 142 may be stored in a decryption key database. The key source 114 also includes unique identifiers associated with the stored decryption keys 142. The initialization container 110 can determine a unique identifier 130 corresponding to the decryption key 118 and transmit a request containing the unique identifier 130 to the key source 114 to retrieve the appropriate decryption key 118. The stored decryption keys 142 may be symmetric keys usable for both encryption and decryption, a private key of an asymmetric key pair, etc.

In some examples, the initialization container 110 can determine the unique identifier 130 associated with the decryption key 118 based on metadata 136 of the pod 108. For example, the distributed computing environment 100 may configure metadata 136 of the pod 108 to include the unique identifier 130 of the pod 108. The initialization container 110 can retrieve the unique identifier 130 from the metadata 136 of the pod 108. The initialization container 110 may then retrieve the decryption key 118 from the key source 114 by transmitting a request 140 to the key source 114. The request 140 can include the unique identifier 130 of the decryption key 118. The key source 114 is configured to identify the decryption key 118 from one or more stored decryption keys 142 based on the unique identifier 130. The key source 114 may then provide the decryption key 118 back to the initialization container 110 where it is stored, in response to the request 140.

With the retrieved encrypted data 116 and the retrieved decryption key 118, the initialization container 110 can generate decrypted data 124. The method of generating the decrypted data 124 may depend on the type of decryption key 118 retrieved. For instance, different decryption techniques will be used with symmetric encryption keys as compared to a private key of an asymmetric key pair. The initialization container 110 can then overwrite the encrypted data 116 with the decrypted data 124 within the object 112, such that the encrypted data 116 is replaced by the decrypted data 124. In some examples, the initialization container 110 can store the encrypted data 116 in a shared volume 126 of the pod 108. The shared volume 126 can be a volume that is accessible to the initialization container 110 and at least one other container of the pod 108, such as a sidecar container 134.

After deploying the initialization container 110, the distributed computing environment 100 may deploy an application container 122 in the pod 108. The application container 122 may be configured to retrieve the decrypted data 124 from the object 112. With the retrieved decrypted data 124, the application container 122 may initialize one or more environment variables 128 of the application container 122.

Additionally, or alternatively, the application container 122 may perform other functions using the decrypted data 124.

In some examples, the distributed computing environment 100 can further deploy a sidecar container 134 within the pod 108. The sidecar container 134 is separate from the initialization container 110 and the application container 122. The sidecar container 134 may be deployed concurrently with, or after, the application container 122. The sidecar container 134 may retrieve the shared encrypted data 116 from the shared volume 126. The sidecar container 134 may use the shared encrypted data 116 to overwrite the decrypted data 124 in the object 112, thereby re-encrypting the previously decrypted data within the object 112. The sidecar container 134 may wait for at least a threshold amount of time after the application container 122 is deployed before overwriting the decrypted data 124 in the object 112 with the encrypted data 116. This can give the application container 122 a sufficient opportunity to retrieve the decrypted data 124 from the object 112, before the data is re-encrypted in the object 112. In some examples, the sidecar container 134 may remove the encrypted data 116 from the shared volume 126 after the sidecar container 134 obtains the encrypted data 116 from the shared volume 126, which can conserve memory.

In other examples, some or all of the operations of the sidecar container 134 may instead be performed by the initialization container 110. For instance, the initialization container 110 can overwrite the decrypted data 124 in the object 112 with the encrypted data 116, after deployment of the application container 122. In this example, the initialization container 110 may forego storing the encrypted data 116 in the shared volume 126. In still other examples, a service 132 outside the pod 108 can be configured to overwrite the decrypted data 124 in the object 112 with the encrypted data 116, after the application container 122 is deployed. The service 132 may receive the encrypted data 116 from the initialization container 110. The service 132 may be invoked asynchronously from the initialization container 110. The initialization container 110 can invoke the service 132 for instance by using HTTP Protocols, and immediately terminate. Upon termination of the initialization container 110, the application container 122 can start. The service 132 can receive parameters from the initialization container 110 including the encrypted data 116 and a specified time to wait before overwriting the decrypted data 124. In these instances, the service 132 can wait until the initialization container 110 completes operations and the application container 122 is able to process the decrypted data 124 prior to overwriting the decrypted data 124 with the encrypted data 116. In either of these alternative examples, the sidecar container 134 may be extraneous and thus excluded.

Figure 2:
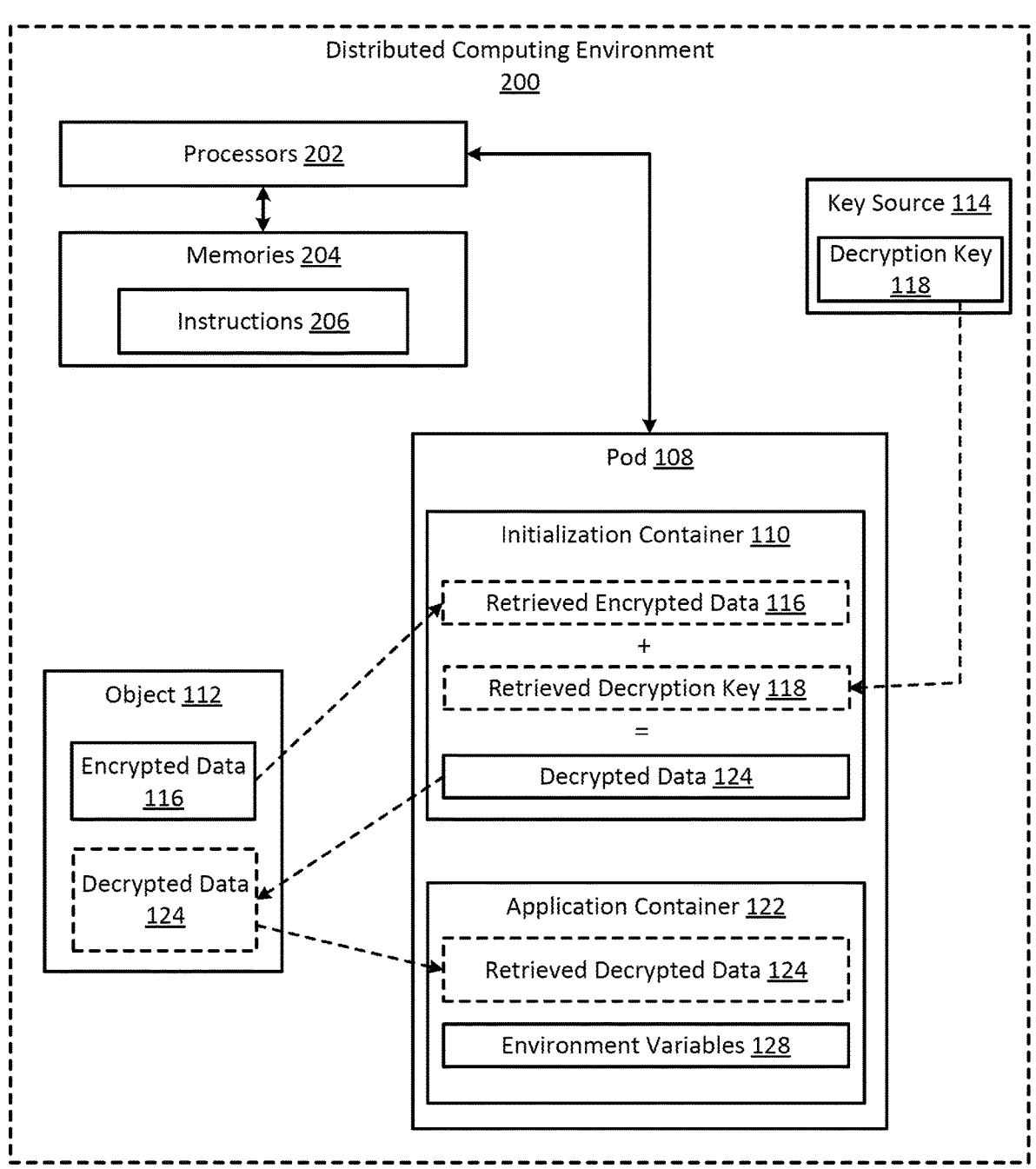
FIG. 2 shows a block diagram of an example of a system for securing sensitive data stored in an object of a distributed computing environment according to some aspects of the present disclosure.

FIG. 2 shows a block diagram of an example of a system for securing sensitive data stored in objects of distributed computing environments according to some aspects of the present disclosure. The distributed computing environment 100 includes one or more processors 202, one or more memories 204, and instructions 206 that are executable by the processors 202.

The processor 202 can include one processor or multiple processors. Non-limiting examples of the processor 202 include a Field-Programmable Gate Array (FPGA), an application-specific integrated circuit (ASIC), a microprocessor, or a combination thereof. The processor 202 can execute instructions 206 stored in the memory 204 to perform operations. In some examples, the instructions 206 can include processor-specific instructions generated by a compiler or an interpreter from code written in any suitable computer-programming language, such as C, C++, C#, and Java.

The memory 204 can include one memory or multiple memories. Memory 204 can be volatile or non-volatile (e.g., any type of memory device that retains stored information when powered off). Non-limiting examples of memory 204 include electrically erasable and programmable read-only memory (EEPROM), flash memory, or any other type of non-volatile memory. At least some of the memory 204 includes a non-transitory computer-readable medium from which the processor 202 can read instructions 206. A computer-readable medium can include electronic, optical, magnetic, or other storage devices capable of providing the one or more processors 202 with computer-readable instructions 206 or other program code. Examples of a computer-readable medium can include magnetic disks, memory chips, ROM, random-access memory RAM, an ASIC, a configured processor, optical storage, or any other medium from which a computer processor can read instructions.

In some examples, the processor 202 can execute the instructions 206 to perform any of the operations described herein. For example, the processor 202 can deploy a pod 108. After deploying the pod 108, the processor 202 can deploy an initialization container 110 and an application container 122. The processor 202 may wait to deploy the application container 122 until after the initialization container 110 performs its decryption functionality described above.

The distributed computing environment 100 can include an object 112, which can store encrypted data. The distributed computing environment 100 may also include a key source 114, which can store a decryption key 118. Alternatively, the key source 114 may be located externally to the distributed computing environment 100.

The initialization container 110, once deployed, can retrieve encrypted data 116 from the object 112 and store the retrieved encrypted data 116, for example in a shared memory (e.g., a shared volume 126). The initialization container 110 can also retrieve a decryption key 118 from a key source 114 and store the retrieved decryption key 118. The decryption key 118 may be a symmetric key capable of being used for both encryption and decryption, a private key of an asymmetric key pair, or another type of decryption key. The retrieval methods described with respect to FIG. 1 may be applied to retrieve the encrypted data 116 and the decryption key 118. By applying the retrieved decryption key 118 to the retrieved encrypted data 116, the initialization container 110 may then generate the decrypted data 124. Once the initialization container 110 generates the decrypted data 124, the initialization container 110 may then overwrite encrypted data 116 stored in the object 112 such that the object 112 only contains the decrypted data 124. This may involve the initialization container 110 transmitting commands to an application programming interface (API) of the distributed computing environment 100 for causing the distributed computing environment 100 to overwrite the existing encrypted data 116 in the object 112 with the decrypted data 124.

The processor 202 can also deploy an application container 122 within the pod 108 and separate from the initialization container 110. The application container 122 may be deployed in the pod 108 after the initialization container 110 has updated the object 112 with the decrypted data 124. The application container 122 may then retrieve the decrypted data 124 stored in the object 112, as generated by the initialization container 110. The retrieved decrypted data 124 may be used by the application container 122 to perform any desired functions, for example to initialize one or more environment variables 128 of the application container 122.

Figure 3:
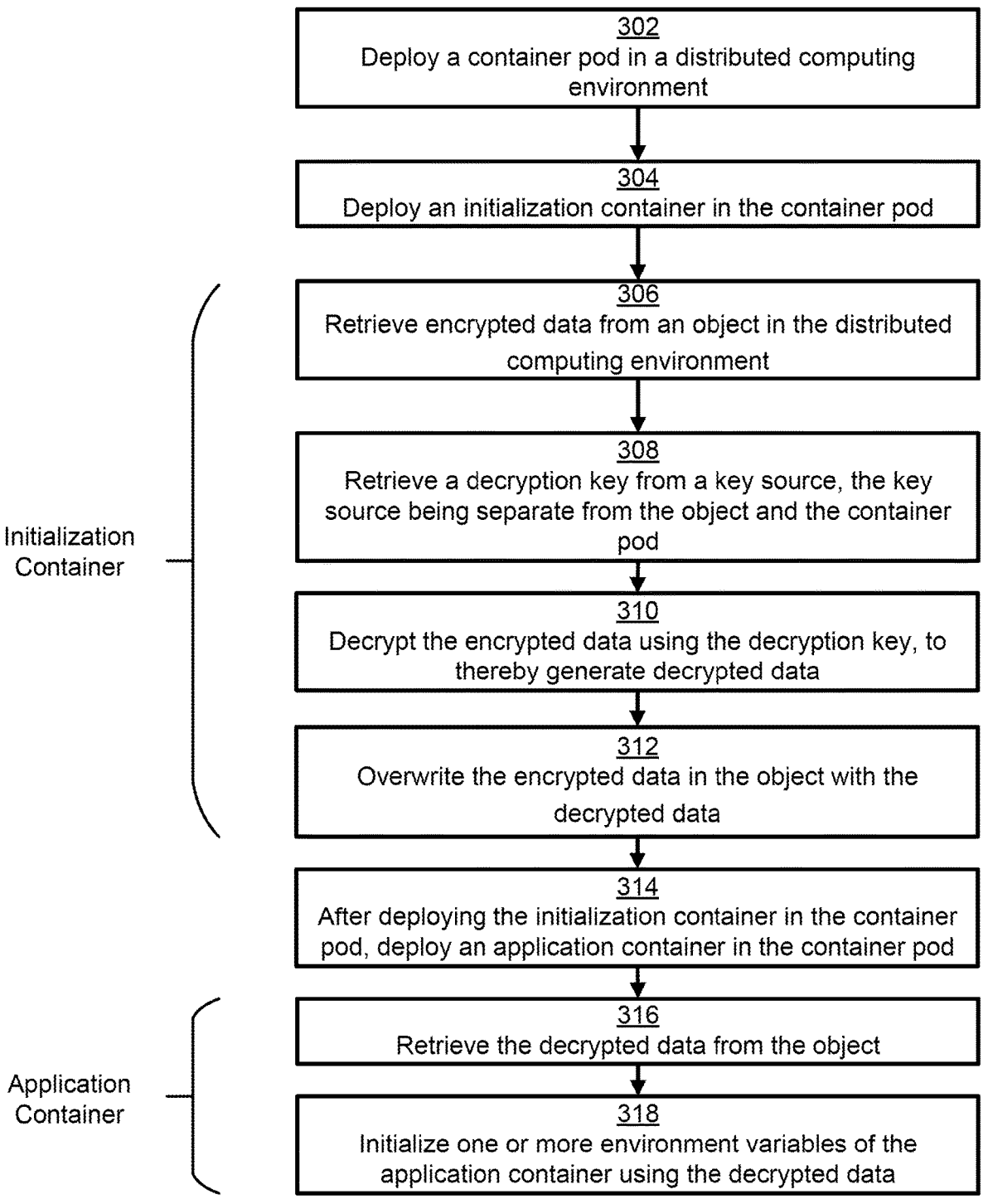
FIG. 3 shows a flowchart of an example of a process for decrypting data and initializing one or more environment variables with the decrypted data according to some aspects of the present disclosure.

FIG. 3 shows a flowchart of an example of a process for decrypting data and initializing one or more environment variables with the decrypted data according to some aspects of the present disclosure. Other examples may include more operations, fewer operations, different operations, or a different order of the operations shown in FIG. 3. The operations of FIG. 3 will now be described below with reference to the components of FIGS. 1-2.

In block 302, the processor 202 deploys a pod 108 in a distributed computing environment 100. To deploy the pod 108, the processor 202 may transmit commands to an API of the distributed computing environment, such as an API of a container orchestration platform of the distributed computing environment 100. For example, the processor 202 may transmit commands to a built-in API of Kubernetes, which can respond to the commands by deploying the pod 108.

In block 304, the processor 202 deploys an initialization container 110 in the pod 108. To deploy the initialization container 110, the processor 202 may transmit commands to an API of the distributed computing environment, such as an API of a container orchestration platform of the distributed computing environment 100. For example, the processor 202 may transmit commands to the built-in API of Kubernetes, which can respond to the commands by deploying the initialization container 110 within the pod 108. In some examples, deployment of the pod 108 may automatically trigger deployment of the initialization container 110, which can help setup the pod 108.

Blocks 306-312 are implemented by an initialization container 110. In block 306, the initialization container 110 retrieves encrypted data 116 from an object 112 in the distributed computing environment 100. The object 112 can be separate from pod 108. In some examples, the initialization container 110 can retrieve the encrypted data 116 by transmitting commands to any of the APIs discussed above.

In block 308, the initialization container 110 retrieves a decryption key 118 from a key source 114. The key source 114 can be separate from the pod 108 and object 112. In some examples in which the key source 114 is internal to the distributed computing environment 100, the initialization container 110 may retrieve the decryption key 118 by transmitting commands to any of the APIs discussed above. In other examples in which the key source 114 is external to the distributed computing environment 100, the initialization container 110 may retrieve the decryption key 118 by engaging in communications with the key source 114 (e.g., a computer system that remotely hosts keys) over a network, such as the Internet.

In block 310, the initialization container 110 decrypts the encrypted data 116 using the decryption key 118 to thereby generate decrypted data 124. Decryption techniques may vary based on the type of encryption methods used within distributed computing environment 100 and the type of decryption key 118 used.

In block 312, the initialization container 110 overwrites the encrypted data 116 in the object 112 with the decrypted data 124. This overwriting may be accomplished by transmitting commands to any of the APIs discussed above.

In block 314, after deploying the initialization container 110 in the pod 108, the processor 202 deploys an application container 122 in the pod 108. To deploy the application container 122, the processor 202 may transmit commands to an API of the distributed computing environment, such as an API of a container orchestration platform of the distributed computing environment 100. For example, the processor 202 may transmit commands to a built-in API of Kubernetes, which can respond to the commands by deploying the application container 122 inside the pod 108.

Blocks 316-318 are implemented by the application container 122. In block 316, the application container 122 retrieves the decrypted data 124 from the object 112. In some examples, the application container 122 can retrieve the decrypted data 124 by transmitting commands to any of the APIs discussed above.

In block 318, the application container 122 initializes one or more environment variables 128 of the application container 122 using the decrypted data 124. Additionally or alternatively, the application container 122 can use the decrypted data 124 for other purposes. The retrieved decrypted data 124 may be identical or substantially identical to the decrypted data 124 as generated by the initialization container 110.

Using the above process, the object 112 serves as an intermediary allowing the initialization container 110 to communicate data, such as the decrypted data 124, with the application container 122. The object 112, as an intermediary, may allow for separation between the initialization container 110 and the application container 122 while allowing for data transmission between the two. This separation can avoid the need to share the decryption key 118 with the application container 122, which can be the most vulnerable of the containers because it may be exposed at an endpoint to external sources.

FIGS. 4-6 show flowcharts of examples of processes for encrypting decrypted data according to some aspects of the present disclosure. Other examples may include more operations, fewer operations, different operations, or a different order of the operations shown in FIGS. 4-6. The operations of FIGS. 4-6 will now be described below with reference to the components of FIGS. 1-2.

FIG. 4 shows a flowchart of an example of a process for overwriting decrypted data with encrypted data in an object according to some aspects of the present disclosure. In other examples, such as the one in FIG. 6, other containers and services may be configured to perform operations similar to those performed by the sidecar container 134 in the process described below.

In block 402, the processor 202 (e.g., an initialization container 110 executing on the processor 202) stores encrypted data 116 in a shared volume 126 of a pod 108. The encrypted data 116 may be the same as encrypted data retrieved from an object 112 in the distributed computing environment 100, for example in block 306 of FIG. 3. In some examples, the encrypted data 116 may not be stored separately in the initialization container 110. Rather, the shared volume 126 can operate as the storage space for storing the shared encrypted data 116.

In block 404, the processor 202 deploys a sidecar container 134 in the pod 108, the sidecar container 134 being different from the application container 122 and the initialization container 110. Blocks 402 and 404 are shown operating in parallel, but either block 402 or 404 may be performed prior to the other, or they may occur substantially simultaneously. Deployment of the sidecar container 134 may be triggered by another container, such as the initialization container 110. For example, successful termination of the initialization container 110 may trigger the deployment (e.g., in parallel) of some or all other containers in the pod 108, such as the sidecar container 134 and the application container 122.

In block 406, the sidecar container 134 obtains the encrypted data 116 from the shared volume 126. In other examples, the sidecar container 134 may retrieve the shared encrypted data 116 from elsewhere within the pod 108. The sidecar container 134 may execute operations separately from the initialization container 110 and the application container 122.

In block 410, the sidecar container 134 waits for at least a threshold amount of time after the application container 122 is deployed before overwriting the decrypted data 124 in the object 112. In other examples, the sidecar container 134 may wait to detect another type of event (other than the expiration of a time period) before proceeding to block 412. For example, the sidecar container 134 can wait for a signal from the application container 122, which may indicate that the application container 122 has retrieved the decrypted data 124 from the object 112, before proceeding to block 412. To detect such an event associated with the application container 122, the sidecar container 134 can repeatedly probe the pod 108 for the state of the application container 122. If the sidecar container 134 determines that the application container 122 is in a running state or a ready state, the sidecar container 134 can proceed to block 412.

In block 412, subsequent to the application container 122 being deployed, the sidecar container 134 overwrites decrypted data 124 in the object 112 with encrypted data 116. Thus, in some examples, the sidecar container 134 restores the underlying data back to its encrypted state in the object 112 by overwriting the previously decrypted data 124 with the encrypted data 116.

In block 414, the sidecar container 134 removes the encrypted data 116 from the shared volume 126. The sidecar container 134 removes the encrypted data 116 from the shared volume 126 after obtaining the encrypted data 116 from the shared volume 126. Removing the encrypted data 116 from the shared volume 126 may include any method of deleting the encrypted data 116, such as deleting the encrypted data 116 from the shared volume 126, deleting the shared volume 126 itself, or overwriting the encrypted data 116 with other data in the shared volume 126. The sidecar container 134 may wait for a time period before removing the encrypted data 116 from the shared volume 126 or may do so immediately after performing the operations of block 412.

FIG. 5 shows a flowchart of an example of a process for retrieving a decryption key 118, wherein the decryption key 118 is associated with a unique identifier 130 at the key source 114 according to some aspects of the present disclosure. The unique identifier 130 may include a hash, serial number, randomly generated number, or some other form of linking different metadata associated with different data.

In block 502, the processor 202 configures metadata 136 of the pod 108 to include the unique identifier 130 of the decryption key 118. The pod 108 may also configure metadata 136 to include the unique identifier 130. In some examples, a user can supply the unique identifier 130 through a user interface to the processor 202 for storage in the metadata 136.

In block 504, the initialization container 110 retrieves the unique identifier 130 of the decryption key 118 from the metadata 136 of the pod 108. In some examples, the sidecar container 134 or another container within the pod may be configured to retrieve the unique identifier 130 and provide it to the initialization container 110.

In block 506 the initialization container 110 retrieves the decryption key 118 from the key source 114 by transmitting a request 140 for the decryption key 118 to the key source

114. The request 140 includes the unique identifier 130 of the decryption key 118. The key source 114 identifies the decryption key 118 from among a plurality of stored decryption keys 142 based on the unique identifier 130 and provides the decryption key 118 back to the initialization container 110 as a response to the request 140.

FIG. 6 shows a flowchart of an example of a process performed by a service 132 for overwriting decrypted data 124 in an object 112 with encrypted data 116 according to some aspects of the present disclosure.

In block 602, a processor 202 deploys a service 132 outside the pod 108. The service 132 may be deployed before, after, or substantially simultaneously with the deployment of an application container 122. The service 132 can be configured to overwrite decrypted data 124 stored in the object 112 with encrypted data 116. The service 132 may also be configured to overwrite the encrypted data 116 stored in the object 112 with the decrypted data 124.

In block 604, the service 132 receives encrypted data 116 from the initialization container 110, for example by communicating with the initialization container 110 via an internal network of the distributed computing environment 100. Service 132 may optionally be invoked from the initialization container 110. The service 132 may provide a notification upon invocation to the initialization container 110 that the service 132 has started but not completed its processes. Once the initialization container 110 finishes its processes, the application container 122 may also start running its processes. While running in parallel with the application container, the service 132 can wait for a threshold time or another triggering event before overriding the decrypted data 124 with the encrypted data 116. Service 132 operates within the distributed computing environment 100 but external to the pod 108. Service 132 may operate within another pod of the distributed computing environment 100. Service 132 may receive instructions from external to the distributed computing environment 100.

In block 606, the service 132 overwrites the decrypted data 124 in the object 112 with the encrypted data 116. In some examples, the use of the service 132 will replace the use of the sidecar container 134, as shown in the example of FIGS. 1 and 4. In these examples, block 610 need not occur.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:
one or more processors; and
one or more memories including instructions that are executable by the one or more processors for causing the one or more processors to:
    deploy a pod in a distributed computing environment;
    deploy an initialization container in the pod, the initialization container being configured to:
        retrieve encrypted data from an object in the distributed computing environment, the object being separate from the pod;
        retrieve a decryption key from a key source, the key source being separate from the object and the pod;
        decrypt the encrypted data using the decryption key, to thereby generate decrypted data; and overwrite the encrypted data in the object with the decrypted data;

deploy an application container in the pod, the application container being configured to:

after the initialization container overwrites the encrypted data in the object with the decrypted data, retrieve the decrypted data from the object; and initialize one or more environment variables of the application container using the decrypted data; and deploy a sidecar container in the pod, the sidecar container being different from the application container and the initialization container, the sidecar container being configured to:

obtain the encrypted data from the initialization container; and after the application container retrieves the decrypted data from the object, overwrite the decrypted data in the object with the encrypted data.

2. The system of claim 1, wherein the initialization container is further configured to store the encrypted data in a shared volume of the pod, and wherein the sidecar container is configured to obtain the encrypted data from the initialization container by retrieving the encrypted data from the shared volume.

3. The system of claim 2, wherein the shared volume is a volume that is shared between the sidecar container and the initialization container, and wherein the sidecar container is configured to remove the encrypted data from the shared volume after obtaining the encrypted data from the shared volume.

4. The system of claim 2, wherein the sidecar container is configured to wait for at least a predefined amount of time after the application container is deployed before overwriting the decrypted data with the encrypted data in the object.

5. The system of claim 1, wherein the key source is external to the distributed computing environment.

6. The system of claim 1, wherein the decryption key is a symmetric encryption key.

7. The system of claim 1, wherein the decryption key is a private key of an asymmetric key pair.

8. The system of claim 1, wherein the decryption key is associated with a unique identifier at the key source, and wherein the one or more memories further include instructions that are executable by the one or more processors for causing the one or more processors to:

configure metadata of the pod to include the unique identifier of the decryption key, wherein the initialization container is configured to:

retrieve the unique identifier of the decryption key from the metadata of the pod; and retrieve the decryption key from the key source by transmitting a request for the decryption key to the key source, wherein the request includes the unique identifier of the decryption key, and wherein the key source is configured to identify the decryption key from among a plurality of stored decryption keys based on the unique identifier and provide the decryption key back to the initialization container as a response to the request.

9. The system of claim 1, wherein the encrypted data includes a sensitive asset.

10. A method comprising:

deploying, by one or more processors, a pod in a distributed computing environment;

deploying, by the one or more processors, an initialization container in the pod, wherein the initialization container:

retrieves encrypted data from an object in the distributed computing environment, the object being separate from the pod;

retrieves a decryption key from a key source, the key source being separate from the object and the pod;

decrypts the encrypted data using the decryption key, to thereby generate decrypted data; and overwrites the encrypted data in the object with the decrypted data;

deploying, by the one or more processors, an application container in the pod, wherein the application container:

retrieves the decrypted data from the object; and initializes one or more environment variables of the application container using the decrypted data; and after the application container retrieves the decrypted data from the object, the initialization container overwrites the decrypted data with the encrypted data in the object.

11. The method of claim 10, wherein the decryption key is associated with a unique identifier at the key source, and further comprising:

configuring metadata of the pod to include the unique identifier of the decryption key;

retrieving, by the initialization container, the unique identifier of the decryption key from the metadata of the pod; and retrieving, by the initialization container, the decryption key from the key source by transmitting a request for the decryption key to the key source, wherein the request includes the unique identifier of the decryption key, and wherein the key source identifies the decryption key from among a plurality of stored decryption keys based on the unique identifier and provides the decryption key back to the initialization container as a response to the request.

12. The method of claim 10, wherein the encrypted data includes a sensitive asset.

13. A non-transitory computer-readable medium comprising program code that is executable by one or more processors for causing the one or more processors to:

deploy a pod in a distributed computing environment;

deploy an initialization container in the pod, the initialization container being configured to:

retrieve encrypted data from an object in the distributed computing environment, the object being separate from the pod;

retrieve a decryption key from a key source, the key source being separate from the object and the pod;

decrypt the encrypted data using the decryption key, to thereby generate decrypted data; and overwrite the encrypted data in the object with the decrypted data; and deploy an application container in the pod, the application container being configured to:

retrieve the decrypted data from the object; and initialize one or more environment variables of the application container using the decrypted data; and deploy a service outside the pod, the service being configured to, after the application container retrieves the decrypted data from the object, overwrite the decrypted data in the object with the encrypted data.

14. The non-transitory computer-readable medium of claim 13, wherein the key source is external to the distributed computing environment.

15. The non-transitory computer-readable medium of claim 13, wherein the decryption key is a symmetric encryption key.

16. The non-transitory computer-readable medium of claim 13, wherein the decryption key is a private key of an asymmetric key pair.

17. The non-transitory computer-readable medium of claim 13, wherein the encrypted data includes a sensitive asset.

18. The non-transitory computer-readable medium of claim 13, wherein the object is a data object in a database.

19. The non-transitory computer-readable medium of claim 13, wherein the object is deployed from a definition file having configuration data.

* * * * *